United States Patent
Long et al.

(10) Patent No.: US 12,160,299 B2
(45) Date of Patent: Dec. 3, 2024

(54) PERFORMANCE IMPROVEMENT FOR UE WITH LIMITED CSI-RS CAPABILITY VIA RECIPROCITY BASED SECTOR SELECTION

(71) Applicant: Telefonaktiebolaget LM Ericsson (publ), Stockholm (SE)

(72) Inventors: Jianguo Long, Ottawa (CA); Shaohua Li, Kanata (CA); Sebastian Faxér, Stockholm (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 32 days.

(21) Appl. No.: 17/908,049

(22) PCT Filed: Mar. 17, 2020

(86) PCT No.: PCT/IB2020/052431
§ 371 (c)(1),
(2) Date: Aug. 30, 2022

(87) PCT Pub. No.: WO2021/186212
PCT Pub. Date: Sep. 23, 2021

(65) Prior Publication Data
US 2023/0141838 A1    May 11, 2023

(51) Int. Cl.
*H04B 7/06* (2006.01)
*H04L 25/02* (2006.01)

(52) U.S. Cl.
CPC ....... *H04B 7/0695* (2013.01); *H04L 25/0212* (2013.01); *H04L 25/0224* (2013.01)

(58) Field of Classification Search
CPC .............. H04B 7/0695; H04L 25/0212; H04L 25/0224
See application file for complete search history.

(56) References Cited

U.S. PATENT DOCUMENTS 11,025,309 B2 *   6/2021   Sundararajan ....... H04B 7/0417
2017/0095467 A1   4/2017   Barnett et al.
(Continued)

FOREIGN PATENT DOCUMENTS

WO   2017/084235 A1   5/2017
WO   2021/019287 A1   2/2021

OTHER PUBLICATIONS

International Preliminary Report on Patentability dated Sep. 20, 2022 issued in PCT Application No. PCT/IB2020/052431, consisting of 10 pages.
(Continued)

*Primary Examiner* — Jaison Joseph
(74) *Attorney, Agent, or Firm* — Weisberg I.P. Law, P.A.

(57) ABSTRACT

According to one aspect, a network node configured to communicate with a wireless device is provided. The network node includes processing circuitry configured to: transmit a plurality of beamformed reference signals, each of the plurality of beamformed reference signals being associated with a respective sector of a cell; receive at least one uplink signal from the wireless device; select one of the plurality of beamformed reference signals for the wireless device to monitor based at least in part on the received at least one uplink signal; and transmit an indication configured to cause the wireless device to monitor the selected one of the plurality of beamformed reference signals.

20 Claims, 10 Drawing Sheets

(56) References Cited

U.S. PATENT DOCUMENTS

| | | | |
|---|---|---|---|
| 2017/0206100 A1 | 7/2017 | Somani et al. | |
| 2018/0031604 A1 | 2/2018 | Chennakeshu et al. | |
| 2018/0041319 A1* | 2/2018 | Cheng | H04B 7/0695 |
| 2018/0091207 A1* | 3/2018 | Kakishima | H04L 25/03343 |
| 2018/0263024 A1* | 9/2018 | John Wilson | H04W 72/23 |
| 2018/0287757 A1 | 10/2018 | Ongggosanusi | |
| 2019/0037426 A1* | 1/2019 | Yu | H04W 72/23 |
| 2019/0069285 A1* | 2/2019 | Chandrasekhar | H04B 7/0695 |
| 2020/0099436 A1* | 3/2020 | Malik | H04B 7/063 |
| 2021/0352622 A1* | 11/2021 | Frenger | H04W 72/046 |

OTHER PUBLICATIONS

International Search Report and Written Opinion dated Jul. 15, 2020 issued in PCT Application No. PCT/IB2020/052431, consisting of 14 pages.

3GPP TS 38.214 V15.0.0 (Dec. 2017); 3rd Generation Partnership Project; Technical Specification Group Radio Access Network; NR; Physical Layer Procedures for Data (Release 15), consisting of 71 pages.

* cited by examiner

PERFORMANCE IMPROVEMENT FOR UE WITH LIMITED CSI-RS CAPABILITY VIA RECIPROCITY BASED SECTOR SELECTION

CROSS-REFERENCE TO RELATED APPLICATIONS

This application is a Submission Under 35 U.S.C. § 371 for U.S. National Stage Patent Application of International Application Number: PCT/IB2020/052431, filed Mar. 17, 2020 entitled "PERFORMANCE IMPROVEMENT FOR UE WITH LIMITED CSI-RS CAPABILITY VIA RECIPROCITY BASED SECTOR SELECTION," the entirety of which is incorporated herein by reference.

TECHNICAL FIELD

Wireless communication and in particular, to reporting in wireless device(s) that have limited reporting capabilities such as limited CSI-RS reporting capabilities.

BACKGROUND

Massive Multiple-Input Multiple-Output (MIMO) is one technology that has been adopted by wireless communication standards bodies in standards such as Third Generation Partnership Project (3GPP) based standards that include 4th Generation (4G) Long Term Evolution (LTE) and 5th Generation (5G) New Radio (NR). Massive MIMO may provide for enhanced wireless network performance and capacity. Codebook-based beamforming is a widely used transmission scheme for Massive MIMO for 5G NR. In codebook-based beamforming schemes, the wireless device provides codebook feedback based on Channel State Information Reference Signal (CSI-RS) signal measurement. After receiving the feedback, the network node uses the feedback to perform beamforming and link adaptation.

Different wireless devices may have different wireless device capabilities to handle the codebook feedback that is based on CSI-RS signal measurements. For example, in NR, up to 32 CSI-RS ports can be supported where, in general, the more CSI-RS ports that are used/activated, the better performance that may be provided. However, more CSI-RS ports may introduce more complexity for wireless device implementation, which may disadvantageously increase cost and/or require wireless device functionality to be updated and/or for wireless devices to be replaced. In existing chipset markets associated with chipsets used for wireless devices, some wireless devices/chipsets support 32-port CSI-RS while some wireless devices/chipsets may only support 8-port CSI-RS or even 4-port CSI-RS.

NR CSI Capabilities

The NR CSI reporting capabilities reported by the wireless devices are summarized in the following examples:
  The maximum number of simultaneous CSI reports [simultaneousCSI-ReportsAllCC] (i.e., number of central processing units (CPUs)/processors) and simultaneous non-zero power (NZP) CSI-RS ports/resources [totalNumberPortsSimultaneousNZP-CSI-RS-ActBWP-AllCC/maxNumberSimultaneousNZP-CSI-RS-ActBWP-AllCC] are reported per band combination [carrier aggregation (CA)-ParametersNR]
  In addition, the maximum number of simultaneous CSI reports in a component carrier (CC) [simultaneous-CSI-ReportsPerCC] and simultaneous NZP CSI-RS ports/resources in a CC [maxNumberSimultaneousNZP-CSI-RS-PerCC] is reported per band [MIMO-ParametersPerBand]
  "Simultaneous" may refer to and/or correspond to:
    For CSI reports:
      Simultaneously occupying CPUs
    For CSI-RS:
      "Simultaneously active" may refer to and/or correspond to:
        For periodic resource: A configured resource is active until Radio Resource Control (RRC) release
        For semi-persistent resource: An activated resource is active until Medium Access Control (MAC) Control Element (CE) deactivation
        For aperiodic resource: A triggered resource is active until Physical Uplink Shared Channel (PUSCH) transmission
  The maximum number of configured CSI Report Settings per Bandwidth Part (BWP) for beam and CSI report respectively [CSI-ReportFramework] and the maximum number of configured CSI-RS/IM ports/resources [CSI-RS-IM-ReceptionForFeedback] are reported per band [MIMO-ParametersPerBand]
    If the band is within a Frequency Range 1 (FR1)-Frequency Range 2 (FR2) band combination, this signaling can be overridden with another signaling [Phy-ParametersFRX-Diff]
  The supported codebooks [CodebookParameters] are signaled per band [MIMO-ParametersPerBand]. For each codebook Type (i.e. Type I SP, Type I MP, Type II, Type II port selection), a list (i.e. multiple) of triplets (maxNumberTxPortsPerResource, maxNumberResourcesPerBand, totalNumberTxPortsPerBand) is signaled:
    axNumberTxPortsPerResource indicates the maximum number of Tx ports in a resource
    maxNumberResourcesPerBand indicates the maximum number of resources across all CCs within a band simultaneously
    totalNumberTxPortsPerBand indicates the total number of Tx ports across all CCs within a band simultaneously
    "Simultaneous" here follows the definition of "Simultaneously active" for the CSI-RS In other words, to achieve optimal performance, from the network node perspective, a maximum number of CSI-RS ports, i.e., 32 CSI-RS ports, are preferable in NR. For 32 CSI-RS ports, a wider beam may be used for each CSI-RS port to cover the whole cell. However, due to implementation complexity, some wireless devices, such as legacy wireless devices, may only support 8 CSI-RS ports or even 4 CSI-RS ports. If only 8 or 4 CSI-RS ports are configured for CSI-RS, the expected performance loss may be severe.

SUMMARY

Some embodiments advantageously provide a method and system for reporting in wireless device(s) that have limited reporting capabilities such as limited CSI-RS reporting capabilities.

According to one or more embodiments, a method for network node transmission for a wireless device with limited CSI reporting capability is provided. In one or more embodiments, limited CSI reporting may correspond to a wireless device that is not configured to operate using 32 CSI-RS ports. The method includes:

1) Multiple CSI-RS resources are configured. Each CSI-RS resource is beamformed with different narrow beamforming weights which covers a fraction of cell, called "beam" or "virtual sector."

2) The network node determines which sector the wireless device is in based on uplink signal(s) and configures the wireless device to monitor the CSI-RS signal beamformed with corresponding narrow beamforming weights.

3) If the wireless device moves from one sector to another sector, the network node may send a message to indicate for the wireless device to start monitoring corresponding CSI-RS resource(s) and report CSI over that resource(s).

One or more embodiments of the disclosure advantageously provide one or more of the following:

1) a configuration that a wireless device with limited CSI report capability can be used while still providing good performance and/or without at least some of the expected performed loss described with respect to existing methods/approaches.

2) a reduction in latency and CSI report overhead such as when compared to existing methods/approaches.

According to one aspect of the disclosure, a network node configured to communicate with a wireless device is provided. The network node includes processing circuitry configured to: transmit a plurality of beamformed reference signals, each of the plurality of beamformed reference signals being associated with a respective sector of a cell; receive at least one uplink signal from the wireless device; select one of the plurality of beamformed reference signals for the wireless device to monitor based at least in part on the received at least one uplink signal; and transmit an indication configured to cause the wireless device to monitor the selected one of the plurality of beamformed reference signals.

According to one or more embodiments of this aspect, the processing circuitry is further configured to determine a sector location of the wireless device within the cell based at least in part on the uplink signals where the sector location of the wireless device is serviced by the selected one of the plurality of beamformed reference signals. According to one or more embodiments of this aspect, the processing circuitry is further configured to: estimate a downlink channel response at the wireless device based at least in part on the at least one uplink signal, the selection of the one of the plurality of beamformed reference signals being based at least in part on the estimated channel response.

According to one or more embodiments of this aspect, the at least one uplink signal includes one of a physical random access channel signal, physical uplink shared channel signal, physical uplink control channel signal and sounding reference signal. According to one or more embodiments of this aspect, the indication is configured to cause the wireless device to monitor only the selected one of the plurality of beamformed reference signals. According to one or more embodiments of this aspect, the processing circuitry is further configured to receive a CSI report associated with the selected one of the plurality of beamformed reference signals, the CSI report being based at least in part on the monitoring.

According to one or more embodiments of this aspect, the indication is provided via radio resource control, RRC, signaling. According to one or more embodiments of this aspect, the plurality of beamformed reference signals correspond to transmissions of a periodic CSI-RS resource that is beam swept over time, and the indication is provided by downlink control information, DCI, where the transmission of the DCI at a predefined time is configured to cause the monitoring of the selected one of the plurality of beamformed reference signals. According to one or more embodiments, the transmission of the DCI at another predefined time is configured to cause monitoring of a different one of the plurality of beamformed reference signals. According to one or more embodiments of this aspect, the plurality of beamformed reference signals corresponds to transmission of an aperiodic CSI-RS resource, where the indication is provided by downlink control information, DCI, and the transmission of the DCI at a predefined time is configured to cause the monitoring of the selected one of the plurality of beamformed reference signals.

According to one or more embodiments of this aspect, each of the plurality of beamformed reference signals are associated with a respective one of a plurality of trigger states, each trigger state is configured to cause the wireless device to monitor a beamformed reference signal associated with the trigger state, and where the indication indicates a one of the plurality of trigger states for monitoring. According to one or more embodiments of this aspect, the processing circuitry is further configured to: determine the wireless device has moved to a different sector location within the cell; select another one of the plurality of beamformed reference signals for the wireless device to monitor based at least in part on the determination that the wireless device has moved to the different sector location within the cell; and transmit another indication that is configured to cause the wireless device to monitor another one of the plurality of beamformed reference signals associated with a sector to which the wireless device has moved.

According to another aspect of the disclosure, a wireless device configured to communicate with a network node is provided. The network node includes processing circuitry configured to: receive at least one of a plurality of beamformed reference signals, each of the plurality of beamformed reference signals being associated with a respective sector of a cell; transmit at least one uplink signal to the network node; receive an indication configured to cause the wireless device to monitor one of the plurality of beamformed reference signals, the indication being based at least in part on the at least one uplink signal; and monitor the one of the plurality of beamformed reference signals based at least in part on the indication.

According to one or more embodiments of this aspect, the at least one uplink signal includes one of a physical random access channel signal, physical uplink shared channel signal, physical uplink control channel signal and sounding reference signal. According to one or more embodiments of this aspect, the indication is configured to cause the wireless device to monitor only the selected one of the plurality of beamformed reference signals. According to one or more embodiments of this aspect, the processing circuitry is further configured to: generate a CSI report based at least in part on the monitored one of the plurality of beamformed reference; and cause transmission of the CSI report to the network node.

According to one or more embodiments of this aspect, the indication is provided via radio resource control, RRC, signaling. According to one or more embodiments of this aspect, the plurality of beamformed reference signals correspond to transmissions of a periodic CSI-RS resource that is beam swept over time, and where the indication is provided by downlink control information, DCI, and where reception of the DCI at a predefined time is configured to cause the monitoring of the one of the plurality of beamformed reference signals. According to one or more embodiments, the reception of the DCI at another predefined time is configured to cause monitoring of a different one of the plurality of beamformed reference signals. According to one or more embodiments of this aspect, the plurality of beamformed reference signals corresponds to transmission of an aperiodic CSI-RS resource; and where the indication is provided by downlink control information, DCI, where reception of the DCI at a predefined time is configured to cause the monitoring of the one of the plurality of beamformed reference signals.

According to one or more embodiments of this aspect, each of the plurality of beamformed reference signals are associated with a respective one of a plurality of trigger states, where each trigger state is configured to cause the wireless device to monitor a beamformed reference signal associated with the trigger state, and where the indication indicates one of the plurality of trigger states. According to one or more embodiments of this aspect, the processing circuitry is further configured to: receive another indication that is configured to cause the wireless device to monitor another one of the plurality of beamformed reference signals that is associated with a sector to which the wireless device has moved, and monitor the other one of the plurality of beamformed reference signals based at least in part on the other indication.

According to another aspect of the disclosure, a method implemented by a network node that is configured to communicate with a wireless device is provided. A plurality of beamformed reference signals are transmitted where each of the plurality of beamformed reference signals being associated with a respective sector of a cell. At least one uplink signal from the wireless device is received. One of the plurality of beamformed reference signals are selected for the wireless device to monitor based at least in part on the received at least one uplink signal. An indication configured to cause the wireless device to monitor the selected one of the plurality of beamformed reference signals is transmitted.

According to one or more embodiments of this aspect, a sector location of the wireless device within the cell is determined based at least in part on the uplink signals where the sector location of the wireless device is serviced by the selected one of the plurality of beamformed reference signals. According to one or more embodiments of this aspect, a downlink channel response at the wireless device is estimated based at least in part on the at least one uplink signal where the selection of the one of the plurality of beamformed reference signals is based at least in part on the estimated channel response. According to one or more embodiments of this aspect, the at least one uplink signal includes one of a physical random access channel signal, physical uplink shared channel signal, physical uplink control channel signal and sounding reference signal.

According to one or more embodiments of this aspect, the indication is configured to cause the wireless device to monitor only the selected one of the plurality of beamformed reference signals. According to one or more embodiments of this aspect, a CSI report associated with the selected one of the plurality of beamformed reference signals is received where the CSI report is based at least in part on the monitoring. According to one or more embodiments of this aspect, the indication is provided via radio resource control, RRC, signaling.

According to one or more embodiments of this aspect, the plurality of beamformed reference signals correspond to transmissions of a periodic CSI-RS resource that is beam swept over time, and where the indication is provided by downlink control information, DCI, and where the transmission of the DCI at a predefined time is configured to cause the monitoring of the selected one of the plurality of beamformed reference signals. According to one or more embodiments, the transmission of the DCI at another predefined time is configured to cause monitoring of a different one of the plurality of beamformed reference signals. According to one or more embodiments of this aspect, the plurality of beamformed reference signals corresponds to transmission of an aperiodic CSI-RS resource and where the indication is provided by downlink control information, DCI, and where the transmission of the DCI at a predefined time is configured to cause the monitoring of the selected one of the plurality of beamformed reference signals. According to one or more embodiments of this aspect, each of the plurality of beamformed reference signals are associated with a respective one of a plurality of trigger states, where each trigger state is configured to cause the wireless device to monitor a beamformed reference signal associated with the trigger state, and where the indication indicates a one of the plurality of trigger states for monitoring. According to one or more embodiments of this aspect, the wireless device is determined to have moved to a different sector location within the cell. Another one of the plurality of beamformed reference signals for the wireless device to monitor is selected based at least in part on the determination that the wireless device has moved to the different sector location within the cell. Another indication that is configured to cause the wireless device to monitor another one of the plurality of beamformed reference signals associated with a sector to which the wireless device has moved is transmitted.

According to another aspect of the disclosure, a method implemented by a wireless device that is configured to communicate with a network node is provided. At least one of a plurality of beamformed reference signals is received where each of the plurality of beamformed reference signals is associated with a respective sector of a cell. At least one uplink signal to the network node is transmitted. An indication configured to cause the wireless device to monitor one of the plurality of beamformed reference signals is received where the indication is based at least in part on the at least one uplink signal. The one of the plurality of beamformed reference signals is monitored based at least in part on the indication.

According to one or more embodiments of this aspect, the at least one uplink signal includes one of a physical random access channel signal, physical uplink shared channel signal, physical uplink control channel signal and sounding reference signal. According to one or more embodiments of this aspect, the indication is configured to cause the wireless device to monitor only the selected one of the plurality of beamformed reference signals. According to one or more embodiments of this aspect, a CSI report is generated based at least in part on the monitored one of the plurality of beamformed reference. Transmission of the CSI report to the network node is caused.

According to one or more embodiments of this aspect, the indication is provided via radio resource control, RRC, signaling. According to one or more embodiments of this aspect, the plurality of beamformed reference signals correspond to transmissions of a periodic CSI-RS resource that is beam swept over time where the indication is provided by downlink control information, DCI, and where reception of the DCI at a predefined time is configured to cause the monitoring of the one of the plurality of beamformed reference signals. According to one or more embodiments, the reception of the DCI at another predefined time is configured to cause monitoring of a different one of the plurality of beamformed reference signals. According to one or more embodiments of this aspect, the plurality of beamformed reference signals corresponds to transmission of an aperiodic CSI-RS resource where the indication is provided by downlink control information, DCI, where reception of the DCI at a predefined time is configured to cause the monitoring of the one of the plurality of beamformed reference signals.

According to one or more embodiments of this aspect, each of the plurality of beamformed reference signals are associated with a respective one of a plurality of trigger states, where each trigger state is configured to cause the wireless device to monitor a beamformed reference signal associated with the trigger state, and where the indication indicates one of the plurality of trigger states. According to one or more embodiments of this aspect, another indication that is configured to cause the wireless device to monitor another one of the plurality of beamformed reference signals that is associated with a sector to which the wireless device has moved is received. The other one of the plurality of beamformed reference signals are monitored based at least in part on the other indication.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
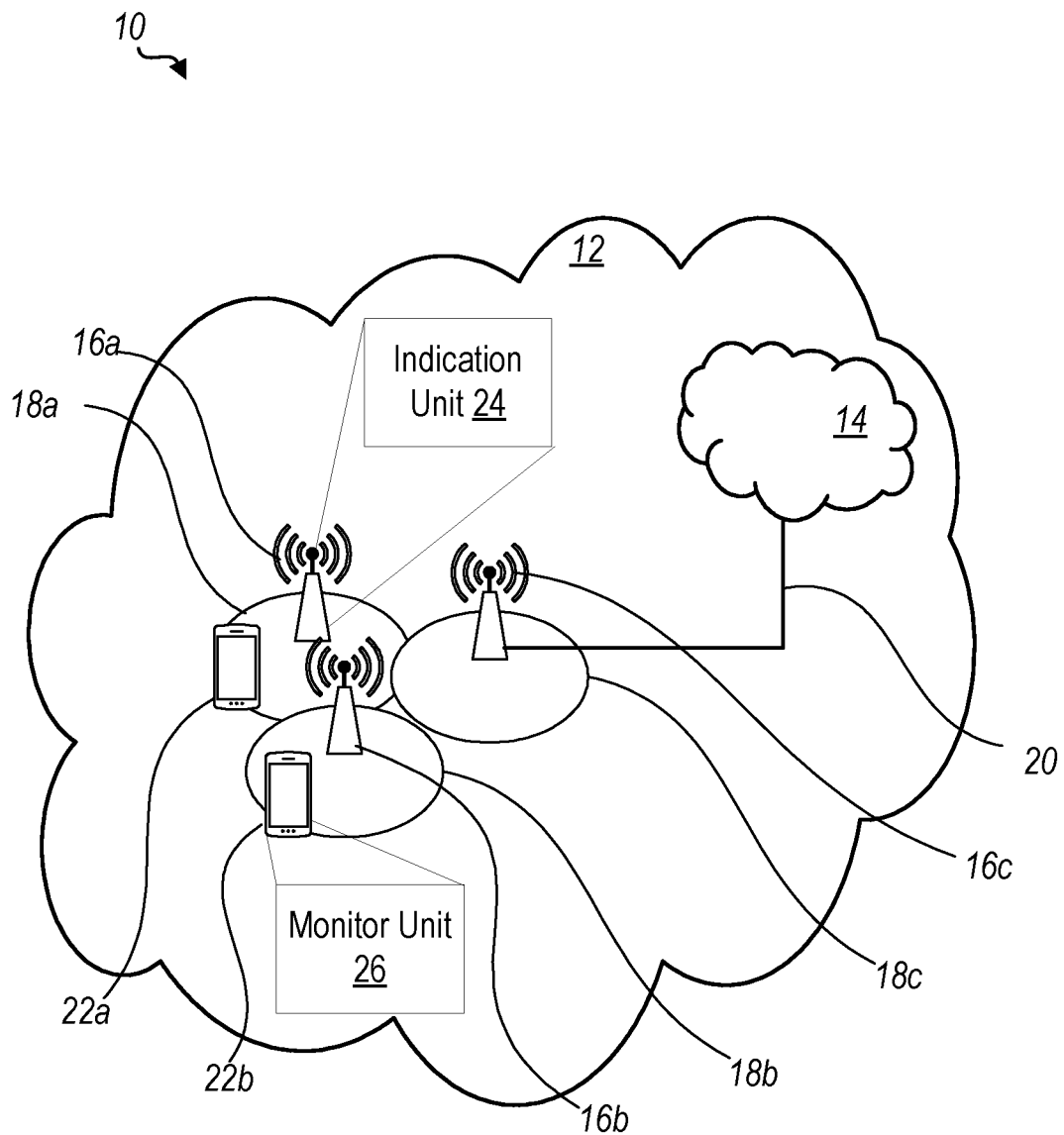
FIG. 1 is a schematic diagram of an exemplary network architecture illustrating a communication system according to the principles in the present disclosure.

Due to implementation complexity, some wireless devices, such as legacy wireless devices, may only be able to support a limited number of CSI-RS ports such as 8 CSI-RS ports or even 4 CSI-RS ports. If only 8 or 4 CSI-RS ports are configured for CSI-RS, the expected performance loss may be severe.

For wireless devices supporting only 8 or 4 CSI-RS ports, to achieve comparable performance with 32 CSI-RS ports, one method is to use a multiple-CSI-RS resource approach. With this approach, one CSI-RS resource set with a plurality of CSI-RS resources is configured. Each CSI-RS resource in the set is beamformed with different narrow beamforming weights that covers a portion of the cell. In each CSI-RS resource, 8 or 4 CSI-RS ports are configured. Based on the measurement of the CSI-RS resources in the CSI-RS resource set, the wireless device is configured to report a CSI-RS resource indication (CRI) in the CSI report, which indicates which sector the wireless device is in. However, the precondition for this approach to function on wireless devices is that the wireless device needs to support multiple CSI-RS resources. Many commercial wireless devices do not support multiple CSI-RS resources functionality, thereby making this approach difficult to implement.

Another method that tries to negate the performance losses of using only 8 or 4 CSI-RS ports verses 32 CSI-RS ports is referred to as the time-domain beam-sweep method/approach. With this method, a single CSI-RS resource is configured. This CSI-RS resource is beamformed with different narrow beamforming weights over time. The wireless device is configured to report CSI for each narrow beamformed CSI-RS signal. Once the network node has received CSI reports for all narrow beamformed CSI-RS signals (i.e., signals corresponding to the CSI-RS resource beamformed with different weights at different times), the network node compares all CSI reports and select the one CSI report with maximum spectrum efficiency for subsequent downlink Physical Downlink Shared Channel (PDSCH) beamforming and link adaptation. This approach is less complex than the method described above and allows the wireless devices supporting only 8 or 4 CSI-RS ports to achieve performance similar to that of wireless devices supporting 32 CSI-RS ports. However, since the network node can only make the selection after CSI reports for all narrow beamformed CSI-RS signals are received, the latency and the CSI reporting overhead are high such as higher than the method/approach described above.

One or more embodiments described herein provide improved performance for wireless devices supporting 8 or 4 CSI-RS ports.

Before describing in detail exemplary embodiments, it is noted that the embodiments reside primarily in combinations of apparatus components and processing steps related to reporting in wireless device(s) that have limited reporting capabilities such as limited CSI-RS reporting capabilities. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein.

As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bits representing the information.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode and/or configuration for CSI-RS monitoring. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

A cell may be generally a communication cell, e.g., of a cellular or mobile communication network, provided by a node. A serving cell may be a cell on or via which a network node (the node providing or associated to the cell, e.g., base station, gNB or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard and/or other existing wireless communication standards. One or more carriers (e.g., uplink and/or downlink carrier/s and/or a carrier for both uplink and downlink) may be associated to a cell.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide reporting in wireless device(s) that have limited reporting capabilities such as limited CSI-RS reporting capabilities.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 is configured to include an indication unit 24 which is configured to perform one or more network node 16 functions described herein. A wireless device 22 is configured to include a monitor unit 26 which is configured to perform one or more wireless device 22 functions described herein.

Example implementations, in accordance with an embodiment, of the WD 22 and network node 16 discussed in the preceding paragraphs will now be described with reference to FIG. 2.

The communication system 10 includes a network node 16 provided in a communication system 10 and including hardware 28 enabling it to communicate with the WD 22. The hardware 28 may include a communication interface 30 for setting up and maintaining a wired or wireless connection with an interface of a different communication device of the communication system 10, as well as a radio interface 32 for setting up and maintaining at least a wireless connection 33 with a WD 22 located in a coverage area 18 served by the network node 16. The radio interface 32 may be formed as or may include, for example, one or more RF transmitters, one or more RF receivers, and/or one or more RF transceivers. The communication interface 30 may be configured to facilitate a connection to one or more other entities such as another network node 16 such a via a backhaul link. The connection may be direct or it may pass through a core network 14 of the communication system 10 and/or through one or more intermediate networks outside the communication system 10.

In the embodiment shown, the hardware 28 of the network node 16 further includes processing circuitry 34. The processing circuitry 34 may include a processor 36 and a memory 38. In particular, in addition to or instead of a processor, such as a central processing unit, and memory, the processing circuitry 34 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 36 may be configured to access (e.g., write to and/or read from) the memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 40 stored internally in, for example, memory 38, or stored in external memory (e.g., database, storage array, network storage device, etc.) accessible by the network node 16 via an external connection. The software 40 may be executable by the processing circuitry 34. The processing circuitry 34 may be configured to control any of the methods and/or processes described herein and/or to cause such methods, and/or processes to be performed, e.g., by network node 16. Processor 36 corresponds to one or more processors 36 for performing network node 16 functions described herein. The memory 38 is configured to store data, programmatic software code and/or other information described herein. In some embodiments, the software 40 may include instructions that, when executed by the processor 36 and/or processing circuitry 34, causes the processor 36 and/or processing circuitry 34 to perform the processes described herein with respect to network node 16. For example, processing circuitry 34 of the network node 16 may include indication unit 24 configured to perform one or more network node 16 functions as described herein.

The communication system 10 further includes the WD 22 already referred to. The WD 22 may have hardware 42 that may include a radio interface 44 configured to set up and maintain a wireless connection 33 with a network node 16 serving a coverage area 18 in which the WD 22 is currently located. The radio interface 44 may be formed as or may include, for example, one or more RF transmitters, one or more RF receivers, and/or one or more RF transceivers.

The hardware 42 of the WD 22 further includes processing circuitry 46. The processing circuitry 46 may include a processor 48 and memory 50. In particular, in addition to or instead of a processor, such as a central processing unit, and memory, the processing circuitry 46 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 48 may be configured to access (e.g., write to and/or read from) memory 50, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 52, which is stored in, for example, memory 50 at the WD 22, or stored in external memory (e.g., database, storage array, network storage device, etc.) accessible by the WD 22. The software 52 may be executable by the processing circuitry 46. The software 52 may include a client application 54. The client application 54 may be operable to provide a service to a human or non-human user via the WD 22. The client application 54 may interact with the user to generate the user data that it provides.

The processing circuitry 46 may be configured to control any of the methods and/or processes described herein and/or to cause such methods, and/or processes to be performed, e.g., by WD 22. The processor 48 corresponds to one or more processors 48 for performing WD 22 functions described herein. The WD 22 includes memory 50 that is configured to store data, programmatic software code and/or other information described herein. In some embodiments, the software 52 and/or the client application 54 may include instructions that, when executed by the processor 48 and/or processing circuitry 46, causes the processor 48 and/or processing circuitry 46 to perform the processes described herein with respect to WD 22. For example, the processing circuitry 46 of the wireless device 22 may include a monitor unit 26 configured to perform one or more wireless device 22 functions as described herein.

Figure 2:
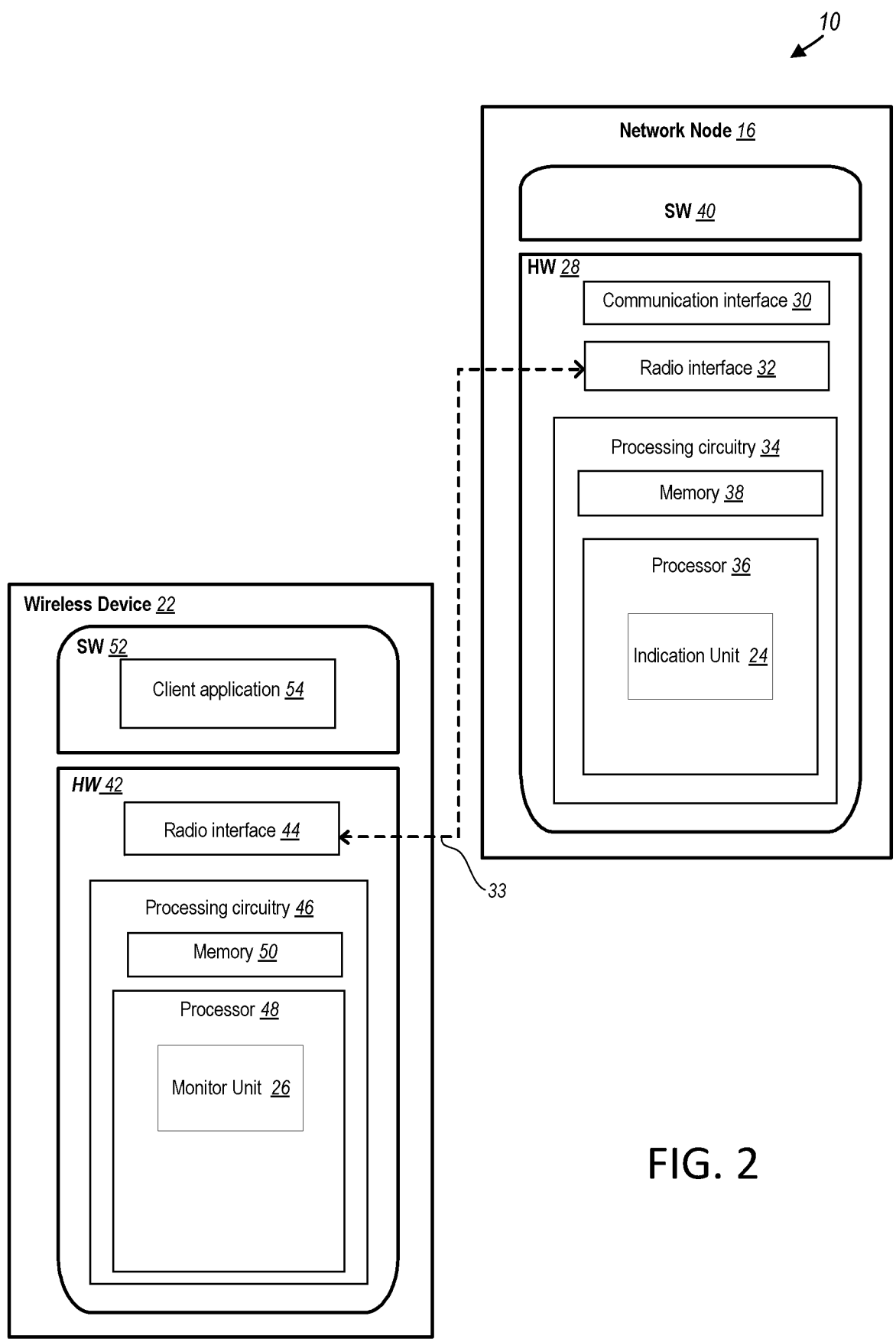
FIG. 2 is a block diagram of a portion of the communication system where the network node communicates with a wireless device according to some embodiments of the present disclosure.

In some embodiments, the inner workings of the network node 16 and WD 22 may be as shown in FIG. 2 and independently, the surrounding network topology may be that of FIG. 1.

The wireless connection 33 between the WD 22 and the network node 16 is in accordance with the teachings of the embodiments described throughout this disclosure. The teachings of some of these embodiments may improve the data rate, latency, and/or power consumption and thereby provide benefits such as reduced user waiting time, relaxed restriction on file size, better responsiveness, extended battery lifetime, etc.

Although FIGS. 1 and 2 show various "units" such as indication unit 24 and monitor unit 26 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
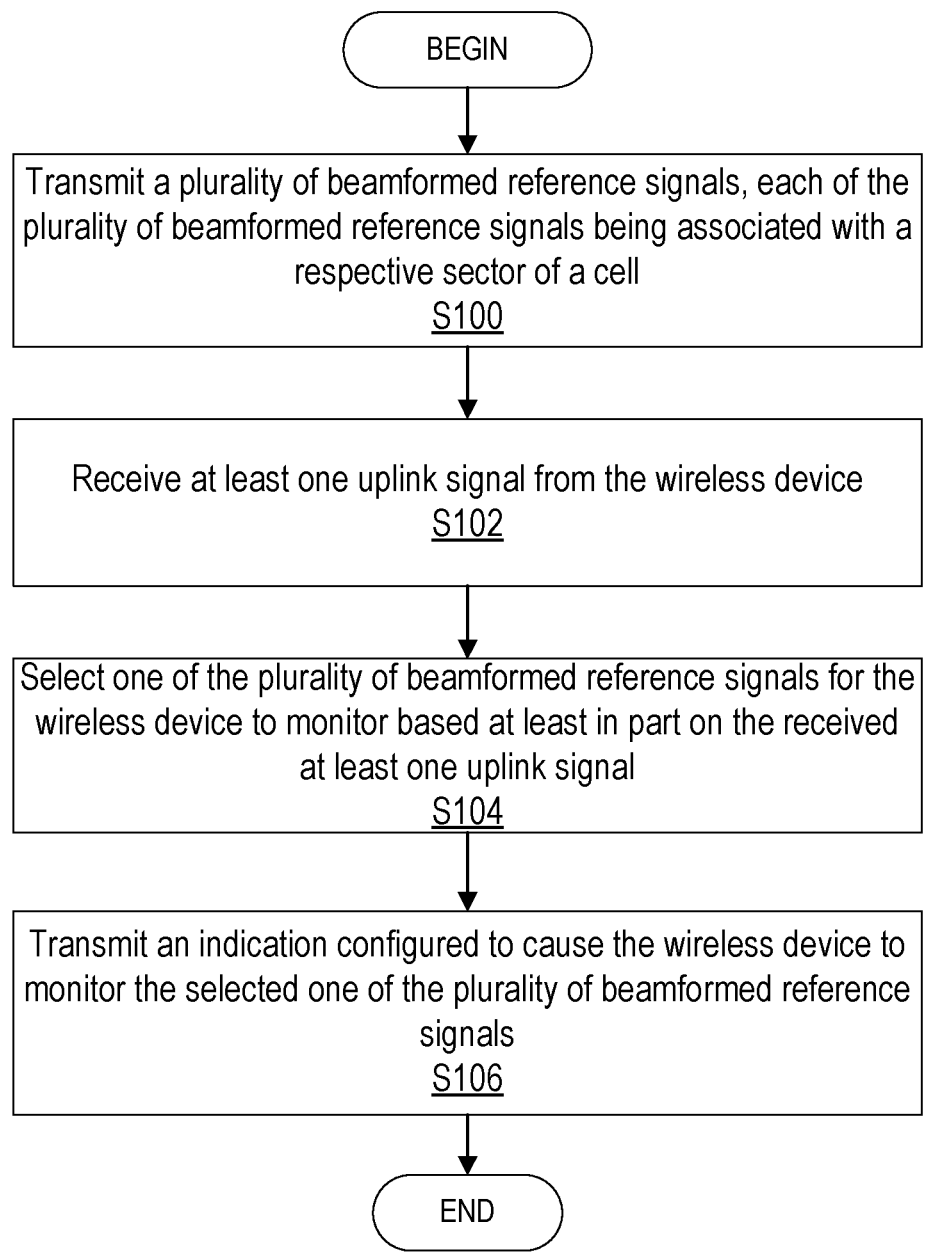
FIG. 3 is a flowchart of an exemplary process in a network node according to some embodiments of the present disclosure.

FIG. 3 is a flowchart of an exemplary process in a network node 16 according to one or more embodiments of the disclosure. One or more Blocks and/or functions performed by network node 16 may be performed by one or more elements of network node 16 such as by indication unit 24 in processing circuitry 34, processor 36, radio interface 32, etc. In one or more embodiments, network node 16 such as via one or more of processing circuitry 34, processor 36, indication unit 24, communication interface 30 and radio interface 32 is configured to transmit (Block S100) a plurality of beamformed reference signals where each of the plurality of beamformed reference signals is associated with a respective sector of a cell, as described herein. In one or more embodiments, network node 16 such as via one or more of processing circuitry 34, processor 36, indication unit 24, communication interface 30 and radio interface 32 is configured to receive (Block S102) at least one uplink signal from the wireless device 22, as described herein.

In one or more embodiments, network node 16 such as via one or more of processing circuitry 34, processor 36, indication unit 24, communication interface 30 and radio interface 32 is configured to select (Block S104) one of the plurality of beamformed reference signals for the wireless device 22 to monitor based at least in part on the received at least one uplink signal, as described herein. In one or more embodiments, network node 16 such as via one or more of processing circuitry 34, processor 36, indication unit 24, communication interface 30 and radio interface 32 is configured to transmit (Block S106) an indication configured to cause the wireless device 22 to monitor the selected one of the plurality of beamformed reference signals, as described herein.

According to one or more embodiments, the processing circuitry 34 is further configured to determine a sector location of the wireless device 22 within the cell based at least in part on the uplink signals where the sector location of the wireless device 22 is serviced by the selected one of the plurality of beamformed reference signals, as described herein. According to one or more embodiments, the processing circuitry 34 is further configured to estimate a downlink channel response at the wireless device 22 based at least in part on the at least one uplink signal where the selection of the one of the plurality of beamformed reference signals is based at least in part on the estimated channel response, as described herein.

According to one or more embodiments, the at least one uplink signal includes one of a physical random access channel signal, physical uplink shared channel signal, physical uplink control channel signal and sounding reference signal. According to one or more embodiments, the indication is configured to cause the wireless device 22 to monitor only the selected one of the plurality of beamformed reference signals. According to one or more embodiments, the processing circuitry 34 is further configured to receive a CSI report associated with the selected one of the plurality of beamformed reference signals where the CSI report is based at least in part on the monitoring.

According to one or more embodiments, the indication is provided via radio resource control, RRC, signaling. According to one or more embodiments, the plurality of beamformed reference signals correspond to transmissions of a periodic CSI-RS resource that is beam swept over time where the indication is provided by downlink control information, DCI and the transmission of the DCI at a predefined time is configured to cause the monitoring of the selected one of the plurality of beamformed reference signals. According to one or more embodiments, the transmission of the DCI at another predefined time is configured to cause monitoring of a different one of the plurality of beamformed reference signals. According to one or more embodiments, the plurality of beamformed reference signals corresponds to transmission of an aperiodic CSI-RS resource where the indication is provided by downlink control information, DCI and the transmission of the DCI at a first predefined time is configured to cause the monitoring of the selected one of the plurality of beamformed reference signals.

According to one or more embodiments, each of the plurality of beamformed reference signals are associated with a respective one of a plurality of trigger states where each trigger state is configured to cause the wireless device to monitor a beamformed reference signal associated with the trigger state, and where the indication indicates a one of the plurality of trigger states for monitoring. According to one or more embodiments, the processing circuitry 34 is further configured to: determine the wireless device 22 has moved to a different sector location within the cell, and select another one of the plurality of beamformed reference signals for the wireless device 22 to monitor based at least in part on the determination that the wireless device has moved to the different sector location within the cell, and transmit another indication that is configured to cause the wireless device to monitor another one of the plurality of beamformed reference signals associated with a sector to which the wireless device has moved.

Figure 4:
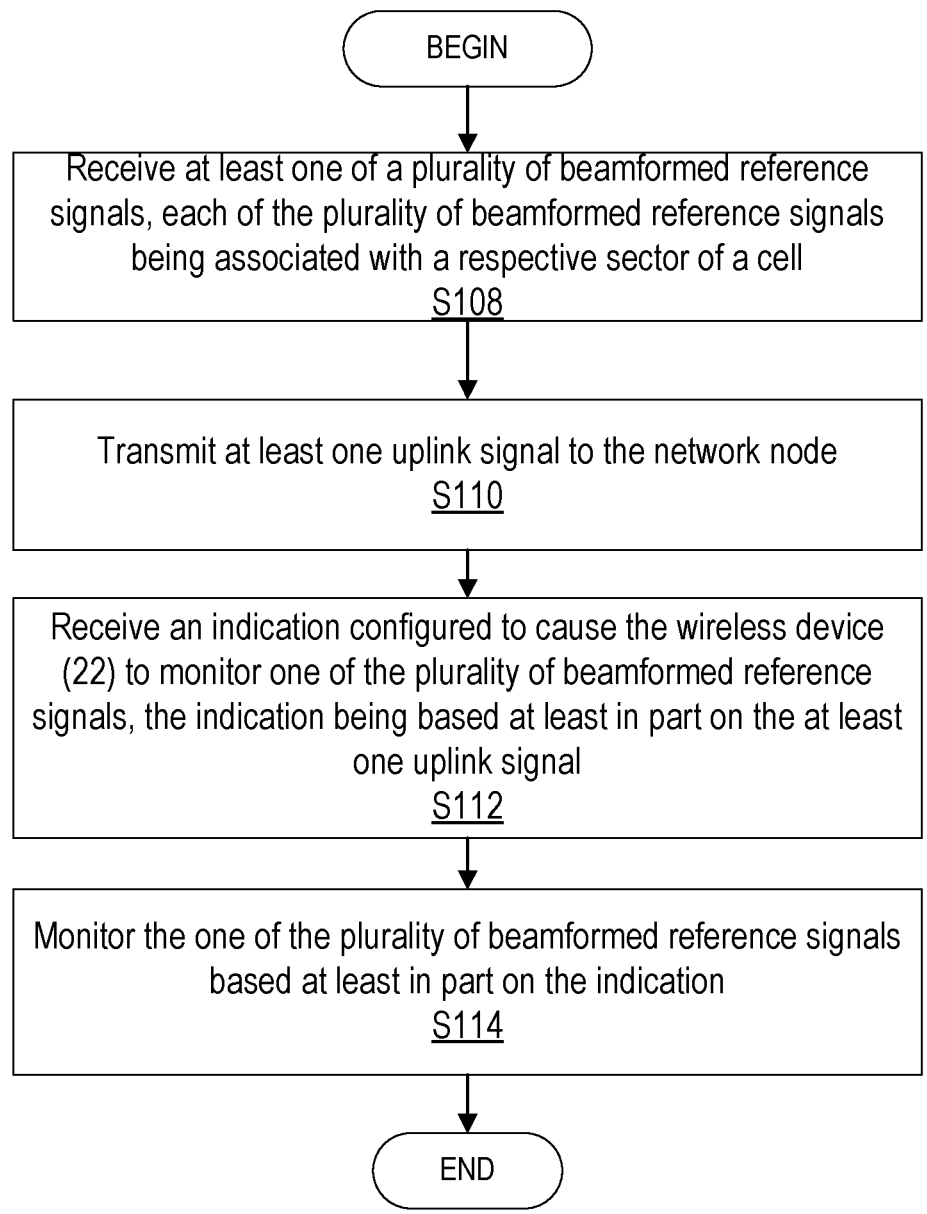
FIG. 4 is a flowchart of an exemplary process in a wireless device according to some embodiments of the present disclosure.
Figure 5:
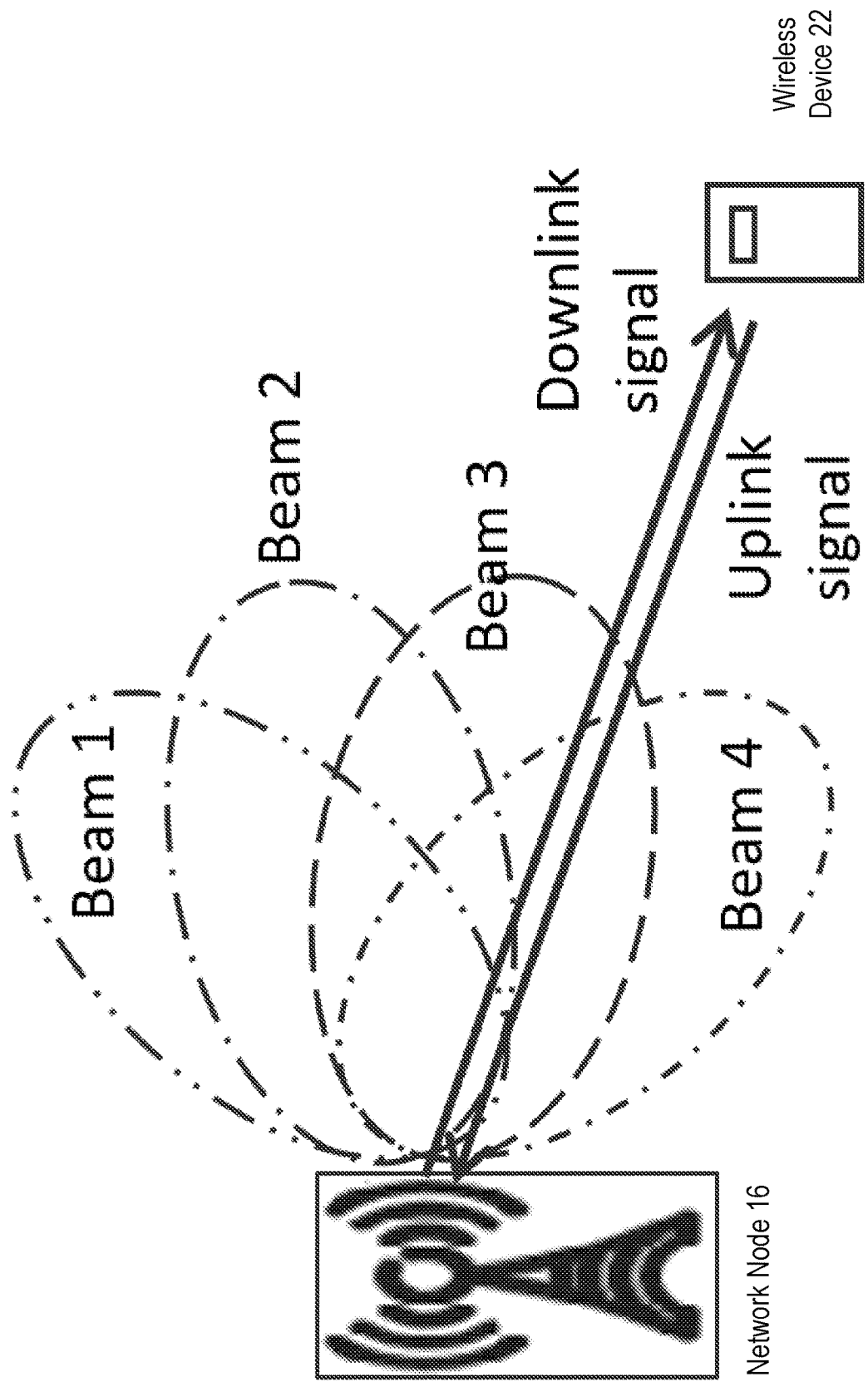
FIG. 5 is a diagram of a cell covered by multiple beams according to one or more embodiments of the disclosure.

FIG. 4 is a flowchart of an exemplary process in a wireless device 22 according to some embodiments of the present disclosure. One or more Blocks and/or functions performed by wireless device 22 may be performed by one or more elements of wireless device 22 such as by monitor unit 26 in processing circuitry 46, processor 48, radio interface 44, etc. In one or more embodiments, wireless device 22 such as via one or more of processing circuitry 46, processor 48, monitor unit 26 and radio interface 44 is configured to receive (Block S108) at least one of a plurality of beamformed reference signals where each of the plurality of beamformed reference signals is associated with a respective sector of a cell, as described herein. In one or more embodiments, wireless device 22 such as via one or more of processing circuitry 46, processor 48, monitor unit 26 and radio interface 44 is configured to transmit (Block S110) at least one uplink signal to the network node 16, as described herein.

In one or more embodiments, wireless device 22 such as via one or more of processing circuitry 46, processor 48, monitor unit 26 and radio interface 44 is configured to receive (Block S112) an indication configured to cause the wireless device to monitor one of the plurality of beamformed reference signals where the indication is based at least in part on the at least one uplink signal, as described herein. In one or more embodiments, wireless device 22 such as via one or more of processing circuitry 46, processor 48, monitor unit 26 and radio interface 44 is configured to monitor (Block S114) the one of the plurality of beamformed reference signals based at least in part on the indication, as described herein.

According to one or more embodiments, the at least one uplink signal includes one of a physical random access channel signal, physical uplink shared channel signal, physical uplink control channel signal and sounding reference signal. According to one or more embodiments, the indication is configured to cause the wireless device 22 to monitor only the selected one of the plurality of beamformed reference signals. According to one or more embodiments, the processing circuitry 46 is further configured to: generate a CSI report based at least in part on the monitored one of the plurality of beamformed reference, and cause transmission of the CSI report to the network node 16. According to one or more embodiments, the indication is provided via radio resource control, RRC, signaling.

According to one or more embodiments, the plurality of beamformed reference signals correspond to transmissions of a periodic CSI-RS resource that is beam swept over time where the indication is provided by downlink control information, DCI, and where reception of the DCI at a predefined time is configured to cause the monitoring of the one of the plurality of beamformed reference signals. According to one or more embodiments, the reception of the DCI at another predefined time is configured to cause monitoring of a different one of the plurality of beamformed reference signals. According to one or more embodiments, the plurality of beamformed reference signals corresponds to transmission of an aperiodic CSI-RS resource where the indication is provided by downlink control information, DCI, and where reception of the DCI at a predefined time is configured to cause the monitoring of the one of the plurality of beamformed reference signals. According to one or more embodiments, each of the plurality of beamformed reference signals are associated with a respective one of a plurality of trigger states where each trigger state is configured to cause the wireless device 22 to monitor a beamformed reference signal associated with the trigger state, and where the indication indicates one of the plurality of trigger states. According to one or more embodiments, the processing circuitry 46 is further configured to receive another indication that is configured to cause the wireless device 22 to monitor another one of the plurality of beamformed reference signals that is associated with a sector to which the wireless device 22 has moved, and monitor the other one of the plurality of beamformed reference signals based at least in part on the other indication.

Having described the general process flow of arrangements of the disclosure and having provided examples of hardware and software arrangements for implementing the processes and functions of the disclosure, the sections below provide details and examples of arrangements for reporting in wireless devices 22 that have limited CSI-RS reporting capabilities.

Having generally described arrangements for CSI-RS reporting in wireless devices 22 that have limited CSI-RS reporting capabilities, details for these arrangements, functions and processes are provided as follows, and which may be implemented by the network node 16 and wireless device 22.

With respect to one or more embodiments described herein, the network node 16 is assumed to use $N_S$ beams or virtual sectors to cover one cell, as illustrated in FIG. 4. For each of the $N_S$ beams, a CSI-RS resource with $N_{CSI\text{-}RS}$ CSI-RS ports is transmitted, where some or all of the N CSI-RS resources may be configured for a wireless device 22. Hence, a total of $N_S$ CSI-RS resources may be transmitted for the cell that may be provided by network node 16. The CSI-RS signal of each of $N_S$ CSI-RS resources is beamformed to cover corresponding sector.

The CSI-RS signals of the $N_S$ CSI-RS resources may be transmitted such as via one or more of processing circuitry 34, processor 36, radio interface 32, indication unit 24, etc., in the same slots or different slots.

For any wireless device 22, the uplink angle of arrival (AoA) can be measured such as via one or more of processing circuitry 46, processor 48, radio interface 44, monitor unit 26, etc., from any uplink signals, such as PRACH or PUSCH/PUCCH or SRS that may be transmitted/communicated by the wireless device 22. Based on the AoA measurement, the sector in which the wireless device 22 is in can be determined such as via one or more of processing circuitry 34, processor 36, radio interface 32, indication unit 24, etc. Once the sector is determined by the network node 16, the wireless device 22 may be configured such as via one or more of processing circuitry 34, processor 36, radio interface 32, indication unit 24, etc., to measure the corresponding CSI-RS resource, generate a CSI report based at least in part on the measurement and send the CSI report to the network node 16. It is noted that embodiments are not limited to the use of AoA to determine the sector that the WD 22 is in. It is contemplated that other techniques (beyond the scope of this disclosure) can be used to ascertain the sector of operation of the WD 22.

Figure 6:
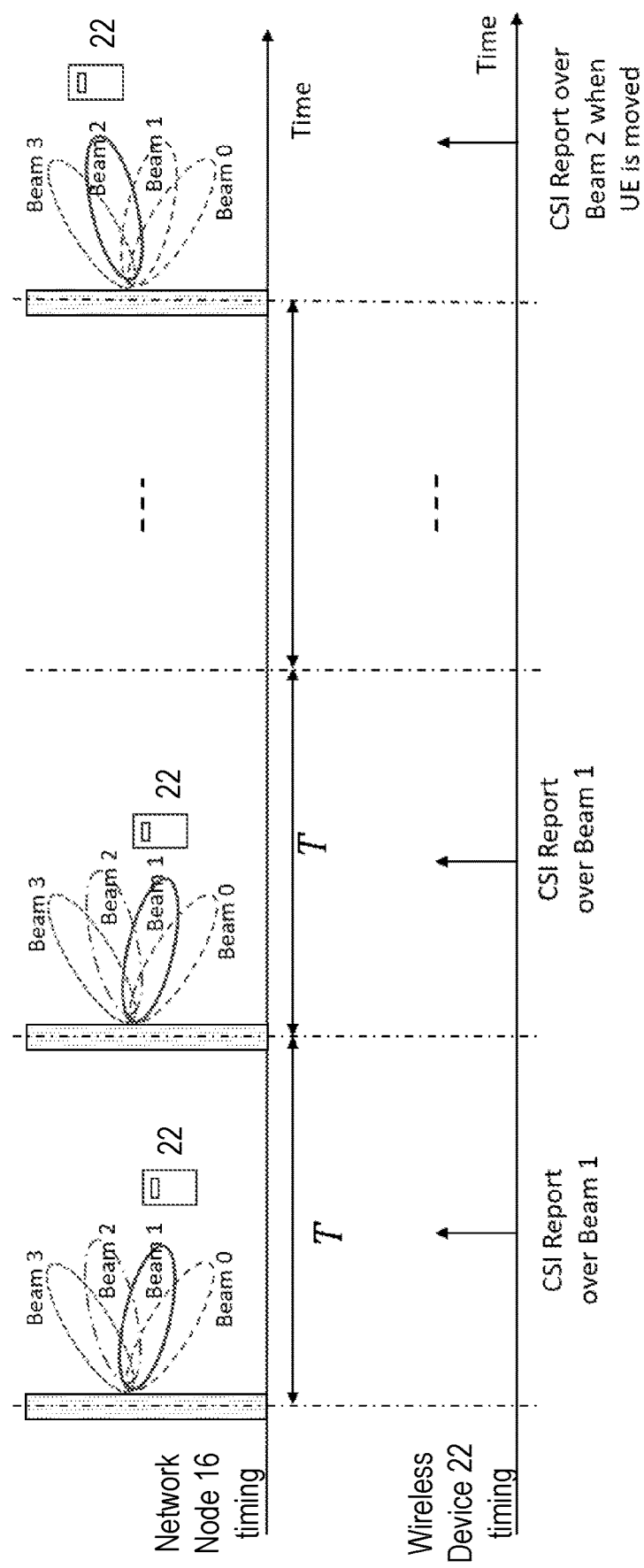
FIG. 6 is a diagram of CSI-RS signal transmission and CSI reporting according to one or more embodiments of the disclosure.

An example of the transmission of CSI-RS signals for four virtual sectors and CSI reporting are illustrated in FIG. 6. In this example and/or in one or more embodiments, the CSI-RS signals are transmitted in the same slot such as via one or more of processing circuitry 34, processor 36, radio interface 32, indication unit 24, etc. However, in one or more other embodiments, the CSI-RS signals for different sectors can also be sent in different slots.

Reciprocity Based Sector Selection and PDSCH Beamforming

In one or more embodiments, for both FDD and TDD, the Angle of Departure (AoD) of the downlink channel is reciprocal to the AoA of uplink signals. If the reciprocity of AoD and AoA holds (i.e., remains true), the network node 16 such as via one or more of processing circuitry 34, processor 36, radio interface 32, indication unit 24, etc., can estimate spatial information of the downlink channel from the uplink signals.

As spatial reciprocity holds, the downlink channel response can be determined from the uplink, i.e., $H^{DL} = H^{UL^T}$, where $(\cdot)^T$ is the transpose operator. The link direction superscript is omitted for clarity such that H is used to represent $H^{DL}$. In Time Division Duplex (TDD) operation where the UL and DL is in the same carrier frequency, the downlink channel response may be derived directly from the transpose of the UL channel matrix as described above. However, for FDD operation, frequency correction may need to be applied, adjusting for the difference in effective antenna element separate in wavelength between the UL and DL carriers by for instance multiplying the channel matrix with a $$T(f_{DL}, f_{UL}) = \text{diag}\left(1, e^{j2\pi\Delta\frac{f_{UL}-f_{DL}}{f_0}\sin(\theta)}, \ldots, e^{j2\pi\Delta\frac{f_{UL}-f_{DL}}{f_0}(N-1)\sin(\theta)}\right).$$

For CSI-RS signal transmission, the precoding matrix is a matrix of dimension $N_{gNB} \times N_{CSI-RS}$, which maps $N_{CSI-RS}$ CSI-RS ports to $N_{gNB}$ downlink transmission antennas with a narrow beamforming precoding weights. Let $W_{p2a}(i)$ be the precoding matrix for the CSI-RS resource i. The total power of CSI-RS signal of CSI-RS resource i measured by wireless device 22 can be calculated as $$P_i = W_i^{p2a^H} H^H H W_i^{p2a} = W_i^{p2a^H} R W_i^{p2a}$$

The sector the wireless device 22 is in can be determined such as via one or more of processing circuitry 34, processor 36, radio interface 32, indication unit 24, etc., as the one detecting the highest power, i.e., $$i = \underset{i}{\arg\min} P_i$$

The sector selection above compares the total power of the CSI-RS signal of all CSI-RS ports in the CSI-RS resource set associated with CSI report. This can be further simplified by using the power of a single port in the CSI-RS resource set. Let $W_{i,j}^{p2a}$ be the jth column vector of $W_i^{p2a}$, i.e., $w_i^{p2a} = [W_{i,0}^{p2a} W_{i,1}^{p2a} \ldots W_{i,N_{CSI-RS}-1}^{p2a}]$, the power of the CSI-RS port j can be calculated by $$P_{i,j} = W_{i,j}^{p2a^H} H^H H W_{i,j}^{p2a} = W_{i,j}^{p2a^H} R W_{i,j}^{p2a}.$$

The sector the wireless device 22 is in can be determined as the one associated with the highest power, i.e., $$i = \underset{i}{\arg\min} P_{i,j}$$

Once the sector is selected such as via one or more of processing circuitry 34, processor 36, radio interface 32, indication unit 24, etc., the wireless device 22 may be configured by the network node 16 such as via one or more of processing circuitry 34, processor 36, radio interface 32, indication unit 24, etc., to measure the corresponding CSI-RS signal and report CSI, i.e., RI/PMI/CQI, based on the measurement. Let $W_{PMI}$ be the precoder defined by wireless device 22 reported PMI, the subsequent data and control signal beamforming weights are given by $$W_{data/control} = W_{m_{sel}} * W_{PMI}.$$

With respect to the description above, multiple narrow beamforming weights are associated with multiple CSI-RS resources and the sector selection may be performed among these resources such as via one or more of processing circuitry 34, processor 36, radio interface 32, indication unit 24, etc. However, this sector selection method/approach may also be used when only one CSI-RS resource is configured. In that case, the single CSI-RS signal is beamformed with different narrow beamforming weights, which covers a fraction of cell, called beam or virtual sector, and sweeps over time.

CSI Report Configuration and Sector Selection Sequence

Figure 7:
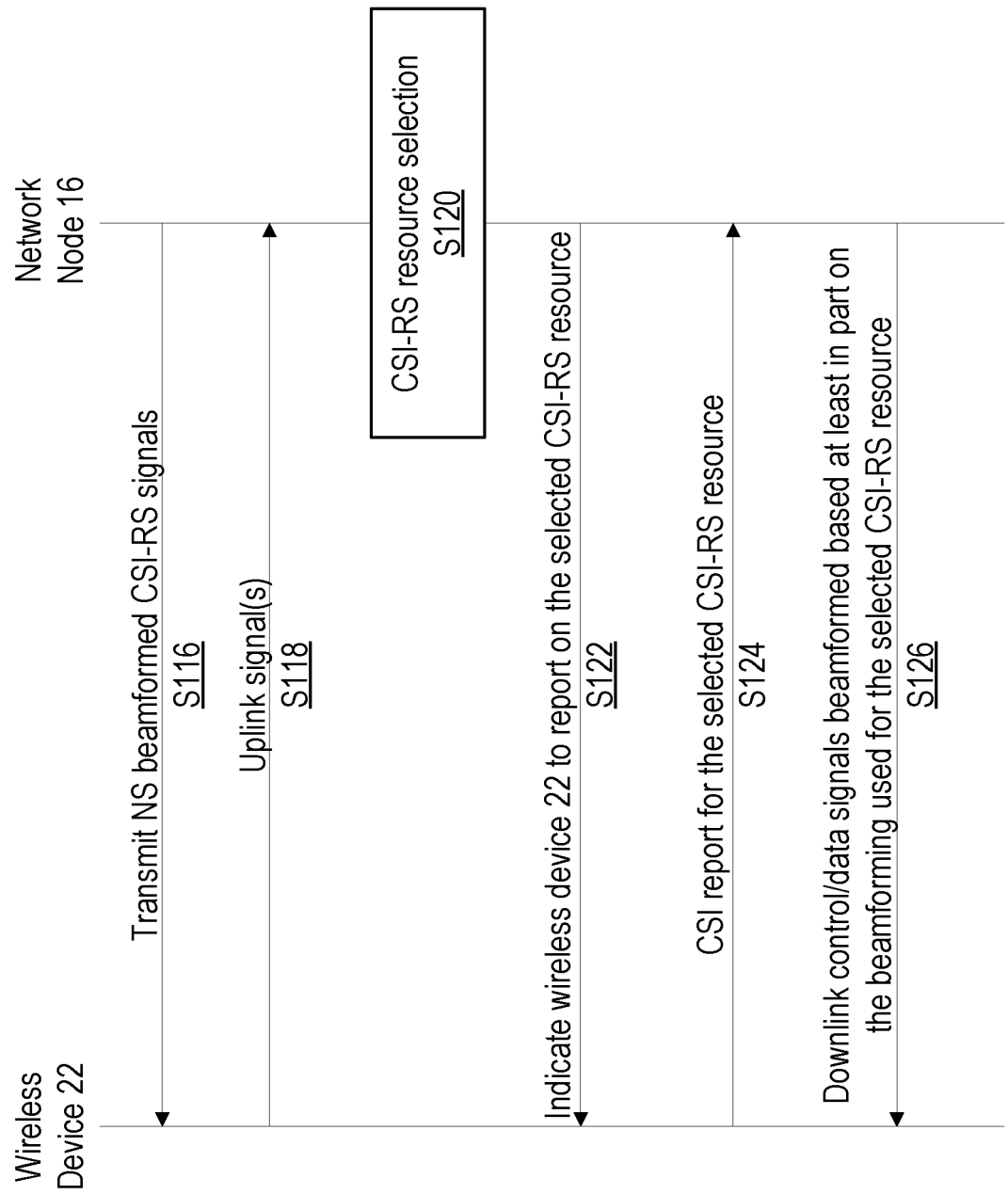
FIG. 7 is a signaling diagram for CSI-RS resource and CSI report configuration according to one or more embodiments of the disclosure.

FIG. 7 is a signaling diagram of the event sequence of CSI-RS resource configuration, sector selection, and CSI reporting, etc.

In Block S116, the network node 16 such as via one or more of processing circuitry 34, processor 36, radio interface 32, indication unit 24, etc., transmits $N_S$ beamformed CSI-RS signals. As one alternative, these $N_S$ beamformed CSI-RS can be transmitted as $N_S$ CSI-RS resources, and each CSI-RS resource is beamed to cover a different sector. As another alternative, $N_S$ beamformed CSI-RS can be transmitted as one single CSI-RS resource such as via one or more of processing circuitry 34, processor 36, radio interface 32, indication unit 24, etc., and this CSI-RS resource is beamformed with $N_S$ different beamforming weights over different time. This beamformed CSI-RS can be transmitted periodically or semi-periodically or aperiodically such as via one or more of processing circuitry 34, processor 36, radio interface 32, indication unit 24, etc.

In Block S118, the uplink signal(s) can be any uplink signals, such as DMRS or data of PUSCH, SRS, PRACH, DMRS or data of PUCCH, etc., that are transmitted from wireless device 22 such as via one or more of processing circuitry 46, processor 48, radio interface 44, monitor unit 26, etc.

In Block S120, the CSI-RS resource selection procedure is performed by the network node 16 such as via one or more of processing circuitry 34, processor 36, radio interface 32, indication unit 24, etc. In one or more embodiments, the CSI-RS resource selection procedure that is performed is described in the "Reciprocity based Sector Selection and PDSCH Beamforming" section that is described above.

In Block S122, an indication is provided and/or communicated by the network node 16 such as via one or more of processing circuitry 34, processor 36, radio interface 32, indication unit 24, etc., to the wireless device 22 such as to cause and/or configured the wireless device 22 such as via one or more of processing circuitry 46, processor 48, radio interface 44, monitor unit 26, etc., to report based on the selected CSI-RS resource. Various examples of the indication are described below. In Block S124, the wireless device 22 such as via one or more of processing circuitry 46, processor 48, radio interface 44, monitor unit 26, etc., communicates a report based at least in part on the selected CSI-RS resource. In Block S126, the network node 16 such as via one or more of processing circuitry 34, processor 36, radio interface 32, indication unit 24, etc., transmits downlink control/data signals beamformed based at least in part on the beamforming used for the selected CSI-RS resource.

In a first example, RRC signaling is used by the network node 16 such as via one or more of processing circuitry 34, processor 36, radio interface 32, indication unit 24, etc.to provide this indication. Specifically, in this example, first, the wireless device 22 is configured with one CSI-RS resources for CSI reporting. The CSI-RS resources may be beamformed or not in this example. After the network node 16 gets and/or determines the sector information such as via one or more of processing circuitry 34, processor 36, radio interface 32, indication unit 24, etc., based at least in part on uplink signals from the wireless device 22, the network node 16 such as via one or more of processing circuitry 34, processor 36, radio interface 32, indication unit 24, etc., uses RRC signaling to reconfigure the CSI-RS information for the CSI report. While the use of RRC signaling as described herein may be considered "slow", e.g., 100 ms latency, RRC signaling may be less complex than the other examples described herein.

Figure 8:
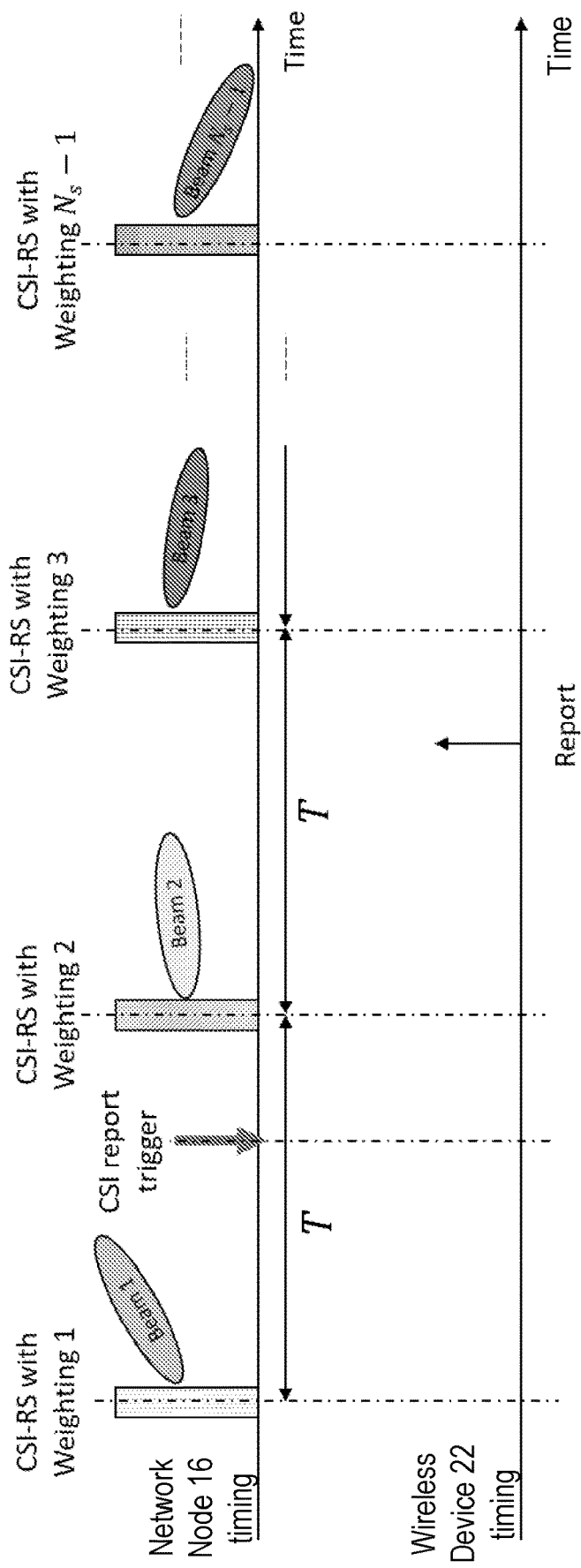
FIG. 8 is a diagram illustrating DCI timing for selecting a report with periodic CSI-RS transmission according to one or more embodiments of the disclosure.

In the second example, one periodic CSI-RS resource is configured by the network node such as via one or more of processing circuitry 34, processor 36, radio interface 32, indication unit 24, etc., and the beam is swept over time. The network node 16 such as via one or more of processing circuitry 34, processor 36, radio interface 32, indication unit 24, etc., sends DCI at predefined times to select the right CSI-RS for the wireless device 22 to send aperiodic CSI-report to the network node 16. According to one or more wireless communication protocols such as 3GPP TS 38.214, if a wireless device 22 is configured with higher layer parameter time Restriction ForChannelMeasurements in CSI-ReportConfig, the wireless device 22 may derive such as via one or more of processing circuitry 46, processor 48, radio interface 44, monitor unit 26, etc., the channel measurements for computing CSI reported in uplink slot n based only on the most recent, no later than the CSI reference resource, occasion of NZP CSI-RS (as may be defined in 3GPP TS 38.211) associated with the CSI resource setting. Therefore, the network node 16 can send such as via one or more of processing circuitry 34, processor 36, radio interface 32, indication unit 24, etc., a DCI trigger at a selected and/or predefined time such that the most recent occasion of NZP CSI-RS signal associated with the CSI resource setting is the one corresponding to the selected beam. FIG. 8 illustrates the use of DCI timing to select the report with periodic CSI-RS transmission that is described above.

Figure 9:
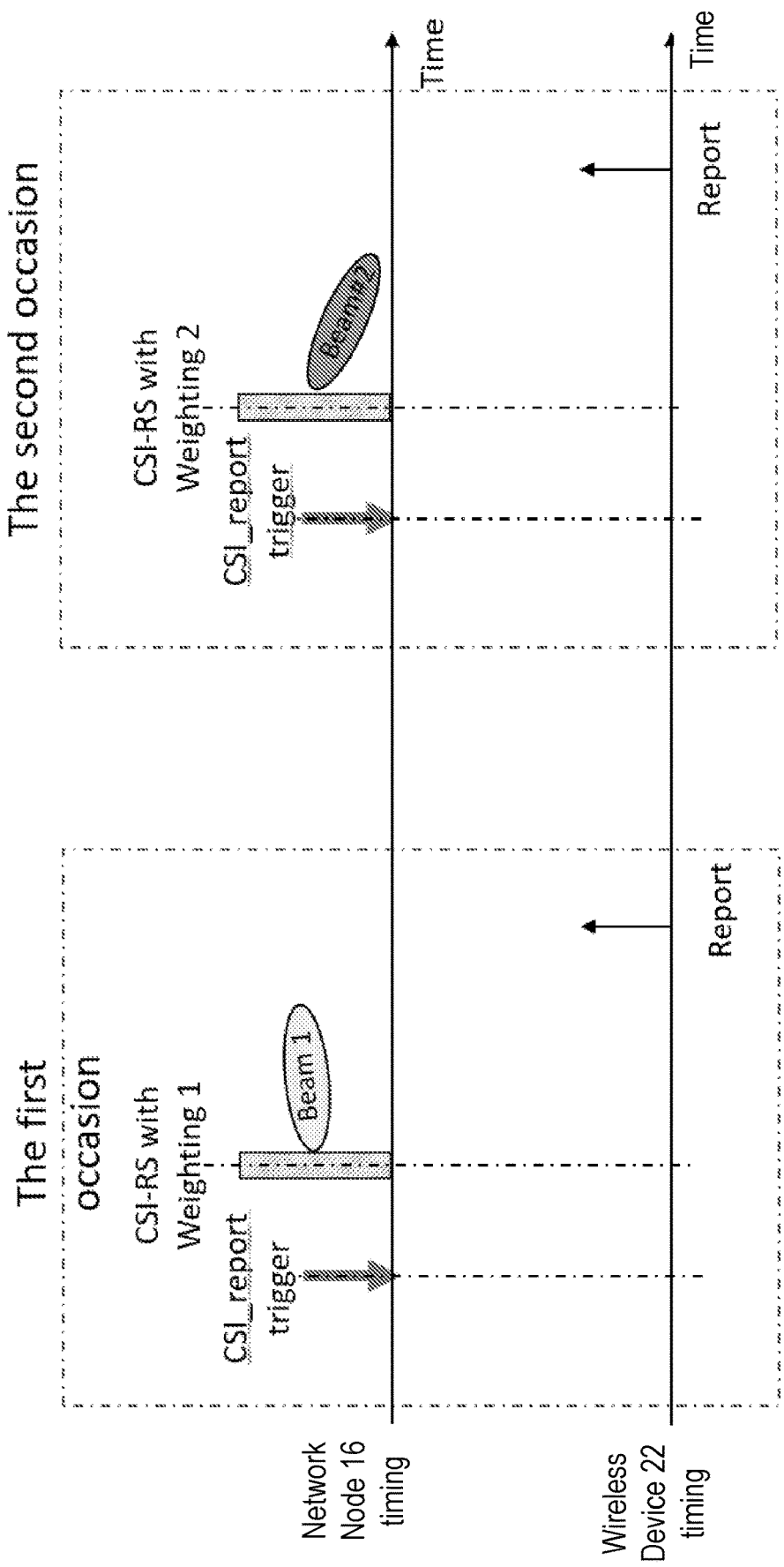
FIG. 9 is a diagram illustrating an aperiodic CSI-RS transmission to trigger a CSI report according to one or more embodiments of the disclosure.

In a third example, one aperiodic CSI-RS resource is configured. In this example, the network node 16 such as via one or more of processing circuitry 34, processor 36, radio interface 32, indication unit 24, etc., may use the DCI to trigger the CSI report over the CSI-RS transmission, which is beamformed to cover a selected sector. This example is illustrated in FIG. 9. In this example, at the first occasion (i.e., time or time period), the wireless device 22 is in the beam 1 coverage, and the network node 16 applies such as via one or more of processing circuitry 34, processor 36, radio interface 32, indication unit 24, etc., beam 1 for the CSI-RS transmission and the wireless device 22 such as via one or more of processing circuitry 46, processor 48, radio interface 44, monitor unit 26, etc., generates a corresponding report. At the second occasion, when the wireless device 22 moves into the second beam coverage, the network node 16 such as via one or more of processing circuitry 34, processor 36, radio interface 32, indication unit 24, etc., applies beam 2 for the CSI-RS transmission and the wireless device 22 such as via one or more of processing circuitry 46, processor 48, radio interface 44, monitor unit 26, etc., generates a corresponding report.

Figure 10:
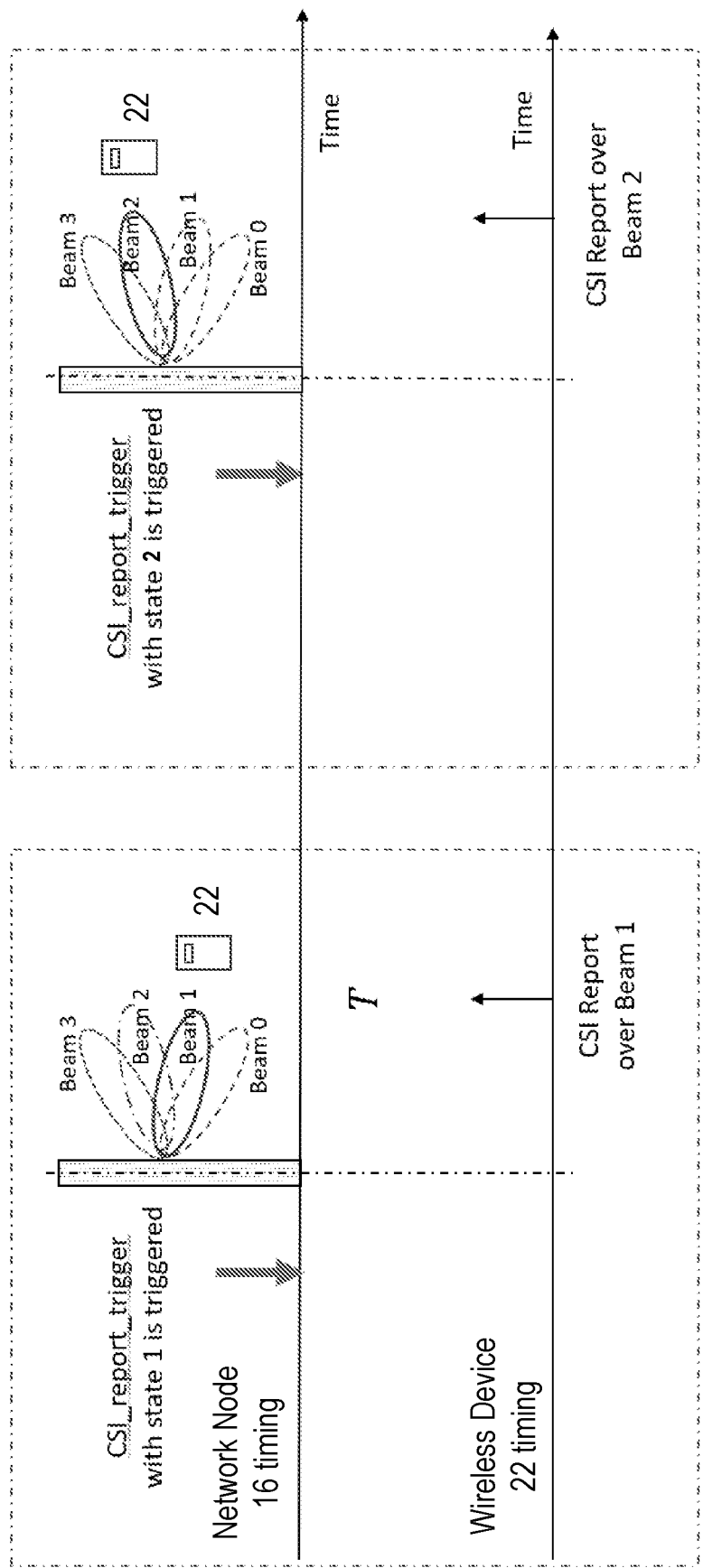
FIG. 10 is a diagram illustrating the triggering of one or more states according to one or more embodiments of the disclosure.

In the fourth alternative, $N_S$ aperiodic CSI-RS resources, one CSI report is configured, and $N_S$ trigger states are configured such a by network node 16 such as via one or more of processing circuitry 34, processor 36, radio interface 32, indication unit 24, etc. The trigger states are set in CSI-AperiodicTriggerStateList, as described in wireless communication standards such as 3GPP TS 38.331. In one or more embodiments, trigger states are one to one mapped to CSI-RS resources such as by network node 16 such as via one or more of processing circuitry 34, processor 36, radio interface 32, indication unit 24, etc., and all the trigger states are associated with the same CSI report. The network node 16 such as via one or more of processing circuitry 34, processor 36, radio interface 32, indication unit 24, etc., triggers the right state with DCI to select one CSI-RS resource, which is beamformed to cover the sector selected, for CSI reporting. One embodiment of this example is shown in FIG. 10. In this embodiment, trigger state 0 is associated with beam 0, trigger state 1 is associated with beam 1, and so on. In the first occasion, aperiodic CSI report trigger triggers state 1 if beam 1 is selected for the wireless device 22. When the wireless device 22 moves from beam 1 to beam 2, the CSI report trigger triggers state 2 which may cause the wireless device 22 to report for the CSI-RS resource that are beamformed to cover beam 2.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, the network node comprising:
   processing circuitry configured to:
      transmit a plurality of beamformed reference signals, each of the plurality of beamformed reference signals being associated with a respective sector of a cell;
      receive at least one uplink signal from the wireless device;
      estimate a downlink channel response at the wireless device based at least in part on the at least one uplink signal;
      determine a sector location of the wireless device within the cell based at least in part on the uplink signals;
      select one of the plurality of beamformed reference signals for the wireless device to monitor based at least in part on the estimated downlink channel response and the sector location of the wireless device being serviced by the selected beamformed reference signal; and
      transmit an indication configured to cause the wireless device to monitor only the selected beamformed reference signal.

2. The network node of claim 1, wherein the at least one uplink signal includes one of a physical random access channel signal, physical uplink shared channel signal, physical uplink control channel signal and sounding reference signal.

3. The network node of claim 1, wherein the indication is configured to cause the wireless device to monitor only the selected one of the plurality of beamformed reference signals.

4. The network node of claim 1, wherein the processing circuitry is further configured to receive a CSI report associated with the selected one of the plurality of beamformed reference signals, the CSI report being based at least in part on the monitoring.

5. The network node of claim 1, wherein the indication is provided via radio resource control, RRC, signaling.

6. The network node of claim 1, wherein the plurality of beamformed reference signals correspond to transmissions of a periodic CSI-RS resource that is beam swept over time; and
   the indication being provided by downlink control information, DCI, the transmission of the DCI at a predefined time being configured to cause the monitoring of the selected one of the plurality of beamformed reference signals.

7. The network node of claim 6, wherein the transmission of the DCI at another predefined time being configured to cause monitoring of a different one of the plurality of beamformed reference signals.

8. The network node of claim 1, wherein the plurality of beamformed reference signals corresponds to transmission of an aperiodic CSI-RS resource; and
   the indication being provided by downlink control information, DCI, the transmission of the DCI at a predefined time being configured to cause the monitoring of the selected one of the plurality of beamformed reference signals.

9. The network node of claim 1, wherein each of the plurality of beamformed reference signals are associated with a respective one of a plurality of trigger states, each trigger state is configured to cause the wireless device to monitor a beamformed reference signal associated with the trigger state; and
   the indication indicating a one of the plurality of trigger states for monitoring.

10. The network node of claim 1, wherein the processing circuitry is further configured to:
    determine the wireless device has moved to a different sector location within the cell;
    select another one of the plurality of beamformed reference signals for the wireless device to monitor based at least in part on the determination that the wireless device has moved to the different sector location within the cell; and
    transmit another indication that is configured to cause the wireless device to monitor another one of the plurality of beamformed reference signals associated with a sector to which the wireless device has moved.

11. A method implemented by a network node that is configured to communicate with a wireless device, the method comprising:
    transmitting a plurality of beamformed reference signals, each of the plurality of beamformed reference signals being associated with a respective sector of a cell;
    receiving at least one uplink signal from the wireless device;
    estimating a downlink channel response at the wireless device based at least in part on the at least one uplink signal;
    determining a sector location of the wireless device within the cell based at least in part on the uplink signals;
    selecting one of the plurality of beamformed reference signals for the wireless device to monitor based at least in part on the estimated downlink channel response and the sector location of the wireless device being serviced by the selected beamformed reference signal; and
    transmitting an indication configured to cause the wireless device to monitor only the selected beamformed reference signal.

12. The method of claim 11 wherein the at least one uplink signal includes one of a physical random access channel signal, physical uplink shared channel signal, physical uplink control channel signal and sounding reference signal.

13. The method of claim 11, wherein the indication is configured to cause the wireless device to monitor only the selected one of the plurality of beamformed reference signals.

14. The method of claim 11, further comprising receiving a CSI report associated with the selected one of the plurality of beamformed reference signals, the CSI report being based at least in part on the monitoring.

15. The method of claim 11, wherein the indication is provided via radio resource control, RRC, signaling.

16. The method of claim 11, wherein the plurality of beamformed reference signals correspond to transmissions of a periodic CSI-RS resource that is beam swept over time; and
    the indication being provided by downlink control information, DCI, the transmission of the DCI at a predefined time being configured to cause the monitoring of the selected one of the plurality of beamformed reference signals.

17. The method of claim 16, wherein the transmission of the DCI at another predefined time being configured to cause monitoring of a different one of the plurality of beamformed reference signals.

18. The method of claim 11, wherein the plurality of beamformed reference signals corresponds to transmission of an aperiodic CSI-RS resource; and
    the indication being provided by downlink control information, DCI, the transmission of the DCI at a predefined time being configured to cause the monitoring of the selected one of the plurality of beamformed reference signals.

19. The method of claim 11, wherein each of the plurality of beamformed reference signals are associated with a respective one of a plurality of trigger states, each trigger state is configured to cause the wireless device to monitor a beamformed reference signal associated with the trigger state; and
    the indication indicating a one of the plurality of trigger states for monitoring.

20. The method of claim 11, further comprising:
    determining the wireless device has moved to a different sector location within the cell;
    selecting another one of the plurality of beamformed reference signals for the wireless device to monitor based at least in part on the determination that the wireless device has moved to the different sector location within the cell; and
    transmitting another indication that is configured to cause the wireless device to monitor another one of the plurality of beamformed reference signals associated with a sector to which the wireless device has moved.

* * * * *